(12) United States Patent
Guo et al.

(10) Patent No.: US 12,379,971 B2
(45) Date of Patent: Aug. 5, 2025

(54) RELIABILITY-AWARE RESOURCE ALLOCATION METHOD AND APPARATUS IN DISAGGREGATED DATA CENTERS

(71) Applicant: City University of Hong Kong, Hong Kong (HK)

(72) Inventors: Chao Guo, Hong Kong (HK); Xinyu Wang, Hong Kong (HK); Moshe Zukerman, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 717 days.

(21) Appl. No.: 17/586,818

(22) Filed: Jan. 28, 2022

(65) Prior Publication Data

US 2023/0244545 A1 Aug. 3, 2023

(51) Int. Cl.
*G06F 9/50* (2006.01)

(52) U.S. Cl.
CPC .................. *G06F 9/5083* (2013.01)

(58) Field of Classification Search
CPC ................. G06F 9/5083; G06F 9/50
See application file for complete search history.

(56) References Cited

U.S. PATENT DOCUMENTS

| | | | | |
|---|---|---|---|---|
| 9,479,451 B1 * | 10/2016 | Wertheimer | ............ | H04L 67/60 709/226 |
| 10,057,339 B2 * | 8/2018 | Yeow | .................... | H04L 67/101 709/226 |
| 10,917,321 B2 | 2/2021 | Schmisseur et al. | | |
| 2020/0097358 A1 * | 3/2020 | Mahindru | ............. | G06F 11/076 714/47.3 |

OTHER PUBLICATIONS

De Carlo, Filippo. (2013). Reliability and Maintainability in Operations Management. 10.5772/54161. (Year: 2013).*
A. B. M. B. Alam, M. Zulkernine and A. Haque, "A Reliability-Based Resource Allocation Approach for Cloud Computing," 2017 IEEE 7th International Symposium on Cloud and Service Computing (SC2), Kanazawa, Japan, 2017, pp. 249-252, doi: 10.1109/SC2.2017.46. (Year: 2017).*
Q. Zhang, Y. Cai, X. Chen, S. Angel, A. Chen, V. Liu, and B. T. Loo, "Understanding the effect of data center resource disaggregation on production DBMSs," Proceedings of the VLDB Endowment, vol. 13, No. 9, pp. 1568-1581, 2020.
G. Zervas, H. Yuan, A. Saljoghei, Q. Chen, and V. Mishra, "Optically disaggregated data centers with minimal remote memory latency: Technologies, architectures, and resource allocation," Journal of Optical Communications and Networking, vol. 10, No. 2, pp. A270-A285, 2018.

(Continued)

*Primary Examiner* — Aimee Li
*Assistant Examiner* — Harrison Li
(74) *Attorney, Agent, or Firm* — Idea Intellectual Limited; Sam T. Yip

(57) ABSTRACT

A method for resource allocation in a disaggregated data center (DDC), comprising: a reliability model to determine an achievable reliability for a service request to the DDC; a integer linear programming (ILP) model to perform a resource allocation for the service request to the DDC such that maximizing total number of service requests received by the DDC accepted for execution is maximized, while the number of the accepted service requests allocated with backup computing resources is minimized; and a heuristic process to perform a resource allocation for the service request to the DDC such that the least reliable node of each needed computing resource type is allocated but still meeting the reliability requirement of the service request.

8 Claims, 3 Drawing Sheets

(56) References Cited

OTHER PUBLICATIONS

H. M. M. Ali, T. E. El-Gorashi, A. Q. Lawey, and J. M. Elmirghani, "Future energy efficient data centers with disaggregated servers," Journal of Lightwave Technology, vol. 35, No. 24, pp. 5361-5380, 2017.

A. Peters, G. Oikonomou, and G. Zervas, "In compute/memory dynamic packet/circuit switch placement for optically disaggregated data centers," Journal of Optical Communications and Networking, vol. 10, No. 7, pp. B164-B178, Jul. 2018.

Y. Yan et al., "All-optical programmable disaggregated data centre network realized by FPGA-based switch and interface card," Journal of Lightwave Technology, vol. 34, No. 8, pp. 1925-1932, 2016.

S. Angel, M. Nanavati, and S. Sen, "Disaggregation and the application," in Proc. 12th {USENIX} Workshop on Hot Topics in Cloud Computing (HotCloud 20), 2020.

P. X. Gao et al., "Network requirements for resource disaggregation," in Proc. 12th {USENIX} Symposium on Operating Systems Design and Implementation ({OSDI} 16), 2016, pp. 249-264.

A. D. Papaioannou, R. Nejabati, and D. Simeonidou, "The benefits of a disaggregated data centre: A resource allocation approach," in Proc. 2016 IEEE Global Communications Conference (GLOBECOM), 2016, pp. 1-7.

S. Han, N. Egi, A. Panda, S. Ratnasamy, G. Shi, and S. Shenker, "Network support for resource disaggregation in next-generation datacenters," in Proc. Proceedings of the Twelfth ACM Workshop on Hot Topics in Networks, 2013, pp. 1-7.

C.-S. Li, H. Franke, C. Parris, B. Abali, M. Kesavan, and V. Chang, "Composable architecture for rack scale big data computing," Future Generation Computer Systems, vol. 67, pp. 180-193, 2017.

C. Guo, K. Xu, G. Shen, and M. Zukerman, "Temperature-aware virtual data center embedding to avoid hot spots in data centers," IEEE Transactions on Green Communications and Networking, 2020, p. 497-511.

W. Xia, P. Zhao, Y. Wen, and H. Xie, "A survey on data center networking (DCN): Infrastructure and operations," IEEE Communications Surveys & Tutorials, vol. 19, No. 1, pp. 640-656, first quarter 2016.

K. Lim, J. Chang, T. Mudge, P. Ranganathan, S. K. Reinhardt, and T. F. Wenisch, "Disaggregated memory for expansion and sharing in blade servers," ACM SIGARCH Computer Architecture News, vol. 37, No. 3, pp. 267-278, Jun. 2009.

B. Abali, R. J. Eickemeyer, H. Franke, C.-S. Li, and M. A. Taubenblatt, "Disaggregated and optically interconnected memory: When will it be cost effective?," arXiv preprint arXiv:1503.01416, 2015.

X. Guo et al., "RDON: A rack-scale disaggregated data center network based on a distributed fast optical switch," Journal of Optical Communications and Networking, vol. 12, No. 8, pp. 251-263, 2020.

A. Pagès, J. Perelló, F. Agraz, and S. Spadaro, "Optimal VDC service provisioning in optically interconnected disaggregated data centers," IEEE Communications Letters, vol. 20, No. 7, pp. 1353-1356, 2016.

Intel.com, "Intel rack scale design architecture." intel.com/content/dam/www/public/us/en/documents/white-papers/rack-scale-design-architecture-white-paper.pdf.

Z. Wei et al., "High throughput computing data center architecture." scribd.com/document/532594570/High-Throughput-Computing-Data-Center-Architecture.

M. Bielski et al., "dReDBox: Materializing a full-stack rack-scale system prototype of a next-generation disaggregated datacenter," in Proc. 2018 Design, Automation & Test in Europe Conference & Exhibition (DATE), 2018, pp. 1093-1098.

K. Asanovic, "Firebox: A hardware building block for 2020 warehouse-scale computers," in Proc. {USENIX} Conference on File and Storage Technologies, 2014.

K. Lim, Y. Turner, J. R. Santos, A. AuYoung, J. Chang, P. Ranganathan, and T. F. Wenisch, "System-level implications of disaggregated memory," in Proc. IEEE International Symposium on High-Performance Comp Architecture, 2012, pp. 1-12.

A. Carbonari and I. Beschasnikh, "Tolerating faults in disaggregated datacenters," in Proc. Proceedings of the 16th ACM Workshop on Hot Topics in Networks, 2017, pp. 164-170.

R. Lin, Y. Cheng, M. De Andrade, L. Wosinska, and J. Chen, "Disaggregated data centers: Challenges and trade-offs," IEEE Communications Magazine, vol. 58, No. 2, pp. 20-26, 2020.

O. O. Ajibola, T. El-Gorashi, and J. M. Elmirghani, "Energy efficient placement of workloads in composable data center networks," Journal of Lightwave Technology, 2021, vol. 39, No. 10, pp. 3037-3063.

A. Pagès, R. Serrano, J. Perelló, and S. Spadaro, "On the benefits of resource disaggregation for virtual data centre provisioning in optical data centres," Computer Communications, vol. 107, pp. 60-74, Jul. 2017.

X. Guo, F. Yan, X. Xue, G. Exarchakos, and N. Calabretta, "Performance assessment of a novel rack-scale disaggregated data center with fast optical switch," in Proc. Optical Fiber Communications Conference and Exhibition (OFC), 2019, pp. 1-3.

X. Guo, F. Yan, G. Exarchakos, X. Xue, B. Pan, and N. Calabretta, "On the workload deployment, resource utilization and operational cost of fast optical switch based rack-scale disaggregated data center network," in Proc. 2020 Optical Fiber Communications Conference and Exhibition (OFC), 2020, pp. 1-3.

M. Amaral et al., "DRMaestro: Orchestrating disaggregated resources on virtualized data-centers," Journal of Cloud Computing, vol. 10, No. 1, pp. 1-20, 2021.

A.-D. Lin, C.-S. Li, W. Liao, and H. Franke, "Capacity optimization for resource pooling in virtualized data centers with composable systems," IEEE Transactions on Parallel and Distributed Systems, vol. 29, No. 2, pp. 324-337, Feb. 2017.

Y. Shan, Y. Huang, Y. Chen, and Y. Zhang, "LegoOS: A disseminated, distributed {os} for hardware resource disaggregation," in Proc. 13th {USENIX} Symposium on Operating Systems Design and Implementation ({OSDI} 18), 2018, pp. 69-87.

D. Rosendo et al., "Availability analysis of design configurations to compose virtual performance-optimized data center systems in next-generation cloud data centers," Software: Practice and Experience, vol. 50, No. 6, pp. 805-826, Apr. 2020.

Y. Lee, H. A. Maruf, M. Chowdhury, and K. G. Shin, "Mitigating the performance-efficiency tradeoff in resilient memory disaggregation," arXiv preprint arXiv:1910.09727, 2019.

A. Verma et al., "Failure rate prediction of equipment: Can Weibull distribution be applied to automated hematology analyzers?," Clinical Chemistry and Laboratory Medicine (CCLM), vol. 56, No. 12, pp. 2067-2071, 2018.

Intel.com, "MTBF for Intel Xeon CPU E5-2620 v4 @ 2.10ghz." [Online]. community.intel.com/t5/Processors/MTBF-for-Intel-Xeon-CPU-E5-2620-v4-2-10GHz/td-p/539642.

O. Doguc and J. E. Ramirez-Marquez, "A generic method for estimating system reliability using Bayesian networks," Reliability Engineering & System Safety, vol. 94, No. 2, pp. 542-550, Feb. 2009.

A. Bhardwaj et al., "NrOS: Effective replication and sharing in an operating system," in Proc. 15th USENIX Symposium on Operating Systems Design and Implementation (OSDI 21). USENIX Association, 2021, pp. 295-312.

D. A. Patterson, G. Gibson, and R. H. Katz, "A case for redundant arrays of inexpensive disks (RAID)," in Proc. Proceedings of the 1988 ACM SIGMOD International Conference on Management of Data, 1988, pp. 109-116.

J. Ansel, K. Arya, and G. Cooperman, "DMTCP: Transparent checkpointing for cluster computations and the desktop," In Proc. 2009 IEEE International Symposium on Parallel & Distributed Processing, 2009, pp. 1-12.

Gurobi.com, "MIPGap." gurobi.com/documentation/9.1/refman/mipgap2.html.

Y. Cheng, M. De Andrade, L. Wosinska, and J. Chen, "Resource disaggregation versus integrated servers in data centers: Impact of internal transmission capacity limitation," in Proc. 2018 European Conference on Optical Communication (ECOC), 2018, pp. 1-3.

(56) References Cited

OTHER PUBLICATIONS

A. Pagès, F. Agraz, and S. Spadaro, "On the impact of it resources disaggregation in optically interconnected data centres," in Proc. 45th European Conference on Optical Communication (ECOC 2019), 2019, pp. 1-4.

A. Peters and G. Zervas, "Network synthesis of a topology reconfigurable disaggregated rack scale datacentre for multi-tenancy," in Proc. Optical Fiber Communications Conference and Exhibition (OFC), 2017, pp. 1-3.

A. Pagès, F. Agraz, and S. Spadaro, "Analysis of service blocking reduction strategies in capacity-limited disaggregated datacenters," in Proc. Optical Fiber Communication Conference, 2020, p. T3K. 2.

V. Shrivastav et al., "Shoal: A network architecture for disaggregated racks," in Proc. 16th {USENIX} Symposium on Networked Systems Design and Implementation ({NSDI} 19), 2019, pp. 255-270.

M. Moralis-Pegios, N. Terzenidis, G. Mourgias-Alexandris, K. Vyrsokinos, and N. Pleros, "A low-latency high-port count optical switch with optical delay line buffering for disaggregated data centers," in Proc. Optical Interconnects XVIII, 2018, vol. 10538, p. 105380.

N. Terzenidis, M. Moralis-Pegios, G. Mourgias-Alexandris, T. Alexoudi, K. Vyrsokinos, and N. Pleros, "High-port and low-latency optical switches for disaggregated data centers: The hipo$\lambda$aos switch architecture," Journal of Optical Communications and Networking, vol. 10, No. 7, pp. B102-B116, Jul. 2018.

N. Alachiotis et al., "dReDBox: A disaggregated architectural perspective for data centers," Hardware Accelerators in Data Centers, pp. 35-56, 2019.

H. M. M. Ali, A. Q. Lawey, T. E. El-Gorashi, and J. M. Elmirghani, "Energy efficient disaggregated servers for future data centers," in Proc. European Conference on Networks and Optical Communications-(NOC), 2015, pp. 1-6.

H. M. M. Ali, A. M. Al-Salim, A. Q. Lawey, T. El-Gorashi, and J. M. Elmirghani, "Energy efficient resource provisioning with VM migration heuristic for disaggregated server design," in Proc. 2016 18th International Conference on Transparent Optical Networks (ICTON), 2016, pp. 1-5.

\* cited by examiner (a) Server-based scenario:

*Series-parallel system*

(b) Disaggregated scenario:

*Parallel-series system*

CPU modules

| | c1 | c2 | c3 | c4 | c5 |
|---|---|---|---|---|---|
| | 0.998 | 0.990 | 0.985 | 0.980 | 0.957 |

↑p1

Memory modules

| | m1 | m2 | m3 | m4 |
|---|---|---|---|---|
| | 0.994 | 0.988 | 0.975 | 0.960 |

↑p2

Disk modules

| | d1 | d2 | d3 | d4 |
|---|---|---|---|---|
| | 0.991 | 0.985 | 0.980 | 0.950 |

↑p3  ✗

Reliability threshold = 0.965
1. p1->c1, p2->m1, p3->d1, feasible
2. move p1 -> c2, feasible
3. move p2->m2, feasible
4. move p3-> d2, infeasible
Finally select c2, m2, d1

FIG. 4

RELIABILITY-AWARE RESOURCE ALLOCATION METHOD AND APPARATUS IN DISAGGREGATED DATA CENTERS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the resource management in data centers. More specifically, the invention relates to techniques of allocating resources to improve reliability of disaggregated data centers.

BACKGROUND OF THE INVENTION

Data centers (DCs) are typically built using one or more clusters of computer servers, each of which tightly integrates various resources such as CPUs, GPUs, transient and non-transient memory circuitries as illustrated in FIG. 1A. These integrated computer servers 101 are further interconnected by a dedicated network inside the DC using a DC network (DCN) 102, that is typically implemented using very high throughput data network components such as highspeed data network switches and optical fibers. Due to the close coupling of different types of resources in each computer server, when one type of resource in a server is exhausted, other resources also become unavailable. This tight resource coupling also makes it difficult to upgrade the integrated computer server. This is the reason why while the resource components in a computer server often have different life-cycles, hardware upgrade and expansions are typically done only at the computer server level. Such an architecture is not only resource-wasteful, it is inefficient for diversified workloads.

In addressing the aforementioned shortcomings and improve resource utilization, upgradability, and scalability, resource disaggregation is becoming a tread in the art. As illustrated in FIG. 1B, resource disaggregation in a disaggregated data center (DDC) separates different types of resources in each computer server into distinct nodes 103 and then interconnects these nodes using a DCN 104 having high throughput and low latency. The management of these nodes, however, presents a new set of challenges.

SUMMARY OF THE INVENTION

It is an objective of the present invention to provide a method and an apparatus for resource disaggregation that not only provides better utilization, easier upgradability and scalability of computing resources, but also improves reliability of a disaggregated data center (DDC). Embodiments of the present invention improve the flexibility in resource allocation such that appropriate group of nodes (or modules of computing resources) can be selected to meet each service request's reliability requirements. Resource utilization of the DDC is improved because of the decoupling of computing resources provided by the resource disaggregation, which prevents chained failures (e.g., failure of one type of resource forcing the entire computer server to fail and making other types of resources in that computer server unusable). Furthermore, the resource disaggregation improves the reliability of the DDC by reducing the failure domain to allow backups and replicas to be allocated more efficiently.

In accordance to one aspect of the present invention, a reliability model for determining a degree of reliability of executing a service request to a DDC implemented with the resource allocation method or the apparatus in accordance an embodiment of the present invention is provided. The apparatus comprises a processor configured to execute the reliability model to determine an achievable reliability for a service request to the DDC. The service request is provisioned either with the DDC's working resources alone or also with the DDC's backup resources. Based on the reliability model, the resource disaggregation method comprises a reliability-aware resource allocation scheme. In accordance to one embodiment, the service request is first attempted to be allocated to only working resources; if the reliability requirement of the service request cannot be met, the service request is then attempted to be allocated to backup resources; and finally, if the reliability requirement of the service request cannot be satisfied, the service request is rejected. The reliability-aware resource allocation scheme also attempts to allocate highly reliable resources to those service requests with high-reliability requirements.

In accordance to another aspect of the present invention, an integer linear programming (ILP) model for reliability-aware resource allocation in a DDC implemented with the resource allocation method or the apparatus in accordance an embodiment of the present invention is provided. The apparatus comprises a processor configured to execute the LLP model to perform the resource allocation for the service request to the DDC. The ILP model is to maximize the number of accepted service requests to the DDC, while minimizing the number of service requests provisioned with backup resources, aiming to guarantee reliability with only working resources.

In accordance to yet another aspect of the present invention, a heuristic process for reliability-aware resource allocation in a DDC implemented with the resource allocation method or the apparatus in accordance an embodiment of the present invention is provided. The apparatus comprises a processor configured to execute the heuristic process to perform the resource allocation for the service request to the DDC. The heuristic process is scalable and has a lower complexity than the ILP model.

BRIEF DESCRIPTION OF THE DRAWINGS

Embodiments of the invention are described in more details hereinafter with reference to the drawings, in which:

FIG. 4 depicts an illustrative diagram of exemplary settings and conditions of an execution of service request to a DDC implemented with a heuristic process in accordance to one embodiment of the present invention.

DETAILED DESCRIPTION

Figure 1:
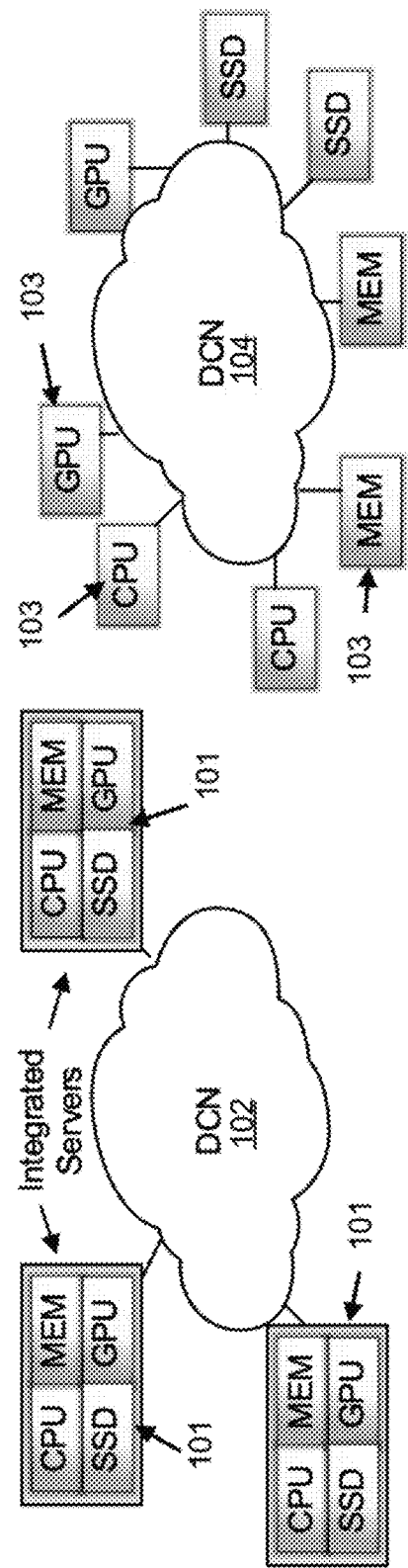
FIG. 1A depicts a schematic diagram illustrating an exemplary DC with integrated computer servers.
FIG. 1B depicts a schematic diagram illustrating an exemplary DDC with nodes.

In the following description, methods and apparatuses for resource allocation in DDCs, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

For simplicity and better illustration of the embodiments of the present invention, the following assumptions are made. In a DDC implemented with the resource allocation method or the apparatus in accordance an embodiment of the present invention, the DDC comprises one or more computer servers; each computer server contains only one hardware module of each type of resource, e.g., one CPU module and one memory circuitry; and each module has a specific resource capacity, e.g., one CPU may contain 16 cores. In practice, a computer server may have more than one module for a specific type of resource, e.g., two CPU modules; in the following description, however, all of them are regarded as a single module with a capacity equaling the total capacity of all these original modules. Further, a fully disaggregated scenario and that each resource module in a computer server becomes a distinct node after disaggregation are assumed.

In addition, service requests to a computer server in a DDC may include requests for virtual machines (VMs), virtual containers, and applications. Each service request is specified by its resource demand and reliability requirement. Although resource disaggregation allows a service request to use more resources than a traditional computer server can provide, for simplicity and better illustration of the embodiments of the present invention, it is assumed that each service request uses a certain resource from one module (e.g., as a traditional computer server can provide) in the disaggregated scenario.

In accordance to one aspect of the present invention, a reliability model for determining a degree of reliability of executing a service request to a DDC implemented with the resource allocation method or the apparatus in accordance an embodiment of the present invention is provided.

The reliability of a resource module is defined as the probability that the module will perform its function during a given period. Apart from this definition, other metrics that can quantitatively measure hardware reliability include the mean time to failure (MTTF), mean time between failure (MTBF), failure in time (FIT), and failure probability. For commercial hardware, the MTBF is often given in their specifications, e.g., the MTBF, FIT, etc. Given the MTBF, the reliability at any time can be estimated with the aid of a particular stochastic process assumption, e.g., exponential or Weibull distribution. There are also other ways to estimate the reliability values, e.g., Bayesian network. Many factors may affect the reliability, e.g., the hardware manufacturing level, age, and carried load. The reliability of a given resource module generally decreases with time as the fault probability often grows when aging. For simplicity and better illustration of the embodiments of the present invention, a static scenario is assumed, and it is further assumed that the service completion time of all given service requests to the DDC is negligible compared with the MTBF of a resource module. Under this situation, hardware reliability can be seen as a constant for all service requests. In any case, at any point of time, e.g., at a time when a service request is received, the DDC, as well as each of the computer servers, contain certain number of working resources and certain number of backup resources.

Figure 2:
FIG. 2 depicts a schematic diagram illustrating a service request being executed by an exemplary series system.

When a service request is scheduled on a traditional server, all the resources need to be available to guarantee a normal service. The service request is modeled as a series system as illustrated in FIG. 2, and a failure of any of the resources results in the failure of the service request. This is also applicable to the disaggregated scenario, where any module allocated to the request should be operational to ensure its service. Thus, in both the server-based and disaggregated scenarios, the achieved reliability $\mathcal{R}$ of the request, e.g., the probability that the request functions normally, is the product of the reliabilities of its required modules, given by:

$$\mathcal{R} = \Pi_{r \in R} \mathcal{R}_{\mathcal{M}_r}; \text{tm (1)}$$

where R is the set of resource module types, which may include CPU, memory circuitry, etc.; $\mathcal{M}_r$ is the resource module of the resource type r allocated to the service request; and $\mathcal{R}_{\mathcal{M}_r}$ is the reliability of the module $\mathcal{M}_r$, e.g., the probability that resource module $\mathcal{M}_r$ functions normally.

Figure 3A:
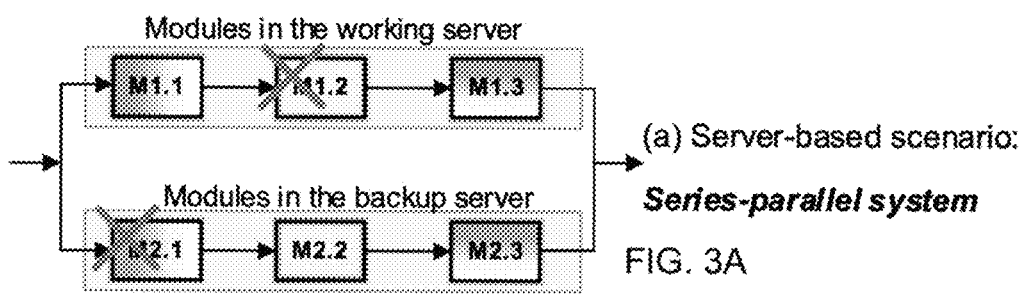
FIG. 3A depicts a schematic diagram illustrating an execution of a service request to a DC under a server-based scenario.
Figure 3B:
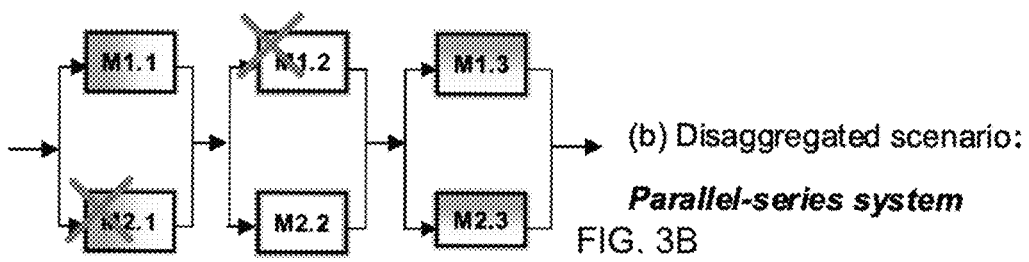
FIG. 3B depicts a schematic diagram illustrating an execution of a service request to a DDC under a disaggregated scenario.

If only allocating the working resources cannot meet the reliability requirement of a service request, the backup resource is allocated to improve the reliability. FIGS. 3A and 3B illustrates the different reliabilities of the service request for the server-based and disaggregated scenarios respectively.

In the server-based scenario, backup resources are provided at the level of a server, which can be modeled as a series-parallel system as illustrated in FIG. 3A. First, in each of the working and backup servers, modules of different resource types form a series system, where all modules in a server should normally work to avoid server failure. Then, the two series systems, e.g., M1.1-M1.2-M1.3 and M2.1-M2.2-M2.3, form a parallel system because as long as one of them is operational, the request can be accommodated. Accordingly, the level of reliability is obtained by:

$$\mathcal{R} = 1 - (1 - \Pi_{r \in R} \mathcal{R}_{\mathcal{M}_r^W}) \cdot (1 - \Pi_{r \in R} \mathcal{R}_{\mathcal{M}_r^B}); \quad (2)$$

where $\mathcal{M}_r^W$ and $\mathcal{M}_r^B$ are the modules of resource type r in the working and backup servers, respectively. The first product term, e.g., $(1 - \Pi_{r \in R} \mathcal{R}_{\mathcal{M}_r^W})$, is the failure probability of the working server, where $\Pi_{r \in R} \mathcal{R}_{\mathcal{M}_r^W}$ is the reliability of the working server, according to (1). Similarly, the term $(1 - \Pi_{r \in R} \mathcal{R}_{\mathcal{M}_r^B})$ is the failure probability of the backup server. The product of the two failure probabilities is the probability that both servers fail.

In the disaggregated scenario, the backup is at the level of a single module. As illustrated in FIG. 3B, the service request can be modeled as a parallel-series system. Different modules of the same type form a parallel system, and for each resource type, as long as one module of this resource type works, the resource is available. Furthermore, all types of resource modules should be available to avoid service failure. Therefore, resource modules of different types further form a series system. The achievable reliability is the product of the reliabilities of all types of resources, as:

$$\mathcal{R} = \Pi_{r \in R}(1 - (1 - \mathcal{R}_{\mathcal{M}_r^W}) \cdot (1 - \mathcal{R}_{\mathcal{M}_r^B})); \quad (3)$$

where $1 - (1 - \mathcal{R}_{\mathcal{M}_r^W}) \cdot (1 - \mathcal{R}_{\mathcal{M}_r^B})$ is the reliability of the pair of modules $\mathcal{M}_r^W$ and $\mathcal{M}_r^B$, which are of resource type r. Such a module pair follows a parallel system model, and only when the two modules fail simultaneously does the resource of type r become unavailable.

The reliability model for determining a degree of reliability of a service request to a DDC implemented with the resource allocation method or the apparatus, therefore, comprises the computation of equation (3) above to obtain the achievable reliability of a service request to a DDC.

The example illustrated in FIGS. 3A and 3B shows that resource disaggregation can achieve higher reliability due to the lower backup granularity. For example, assume that M2.1 and M1.2 in the disaggregated scenario fail simultaneously, then the service request's resource demand can still be satisfied by the remaining modules in the disaggregated scenario, but the service request fails in the server-based scenario. Assume that in the example illustrated in FIGS. 3A and 3B, each module has the same reliability of 99.5%. According to (2), the achievable reliability in the server-based scenario is 99.9777241%. According to (3), the achievable reliability in the disaggregated scenario is 99.9925002%, which is 0.0147761% higher than the former.

The reliability model (3), however, does not apply to legacy applications or VMs because they are not disaggregation-aware and do not support component-level failure independence. For example, in a VM, as long as even one single module used by this VM fails, all used resources will be isolated. Therefore, for legacy applications and VMs, the reliability model is the same as the server-based scenario. To maximize the reliability performance benefit brought from failure independence, significant evolutionary upgrades, e.g., RAID-style replication, in application protocol design and operating system (OS) models are needed, but they are considerably more complicated. For simplicity and better illustration of the embodiments of the present invention, it is assumed that service requests are disaggregation-aware and support failure independence.

In one embodiment of the DDC implemented with the resource allocation method or the apparatus in accordance an embodiment of the present invention, the DDC comprises a central controller responsible for global resource management. The DDC further comprises one or more lower-level (e.g., rack-level) systems for monitoring the state information of hardware modules, including module load, reliability and health condition, and failure occurrence, and report them to the central controller. The lower-level systems create one or more instances for a service request received based on the allocation results received from the central controller. For a service request provisioned with backup resources, each backup module (e.g., CPU) is a standby counterpart of a working module. The DDC, the computer servers, and/or modules are implemented with certain protocols to support fast recovery. For example, when implementing RAID-style replication for tolerating memory fault, the lower-level systems create a memory replica of the working memory module on the backup memory module. The lower-level systems also mirror the identical traffic from the nodes to the replica. For another example, the checkpointing technique may be employed by the lower-level systems for recovering from CPU failures. In this case, the lower-level systems checkpoint the CPU state, e.g., states of registers and program counter. The state information is then stored in the assigned memory for fast recovery. In addition, when a failure occurs in one of the working modules, the lower-level systems switch the running applications to the corresponding backup module, while other working modules keep serving the service request without interrupting the service.

In accordance to another aspect of the present invention, an ILP model for reliability-aware resource allocation in a DDC implemented with the resource allocation method or the apparatus is provided. The objective of the ILP model is to maximize the number of accepted service requests to the DDC, while minimizing the number of service requests provisioned with backup resources, aiming to guarantee reliability with only working resources.

In one embodiment, ILP model comprises computing the maximum of:

$$\Sigma_{i \in I} \omega_i - \epsilon \cdot \Sigma_{i \in I} \chi_i; \quad (4)$$

where $\Sigma_{i \in I} \omega_i$ is the number of accepted service requests; $\Sigma_{i \in I} \chi_i$ is the number of accepted service requests provisioned with backup resources; and $\epsilon$ is a weight factor. When $\epsilon = 1$, the objective of the ILP model turns into maximizing the number of accepted service requests that are not allocated with backup resources. To give a higher priority to maximization of the number of accepted service requests, the weight factor $\epsilon$ is to be set to a small number, e.g., $\epsilon = 0.001$.

The objective of the ILP model is, however, subject to the following constraints:

$$\sigma_i = \Sigma_{m \in M_r} \delta_m^{ir} \forall\ i \in I, r \in R; \quad (5)$$

$$\chi_i = \Sigma_{m \in M_r} \gamma_m^{ir} \forall\ i \in I, r \in R; \quad (6)$$

$$\delta_m^{ir} + \gamma_m^{ir} \leq 1 \forall\ i \in I, r \in R, m \in M_r; \quad (7)$$

$$\sigma_i \geq \chi_i \forall\ i \in I; \quad (8)$$

$$\omega_i = \sigma_i \forall\ i \in I; \quad (9)$$

$$\Sigma_{i \in I} (\delta_m^{ir} + \gamma_m^{ir}) \cdot D_{ir} \leq C_{rm} \forall\ r \in R, m \in M_r; \quad (10)$$

$$\Sigma_{r \in R} \Sigma_{m \in M_r} \xi_m^{ir} \cdot \log \mathcal{R}_{rm} + \quad (11)$$

$$\Sigma_{r \in R} \Sigma_{m,n \in M_r} \mu_m^{ir} \cdot \log(1 - (1 - \mathcal{R}_{rm}) \cdot (1 - \mathcal{R}_{rn})) \geq \omega_i \cdot \log \theta_i \forall\ i \in I;$$

$$\begin{cases} \mu_{mn}^{ir} \geq \delta_m^{ir} + \gamma_n^{ir} - 1 \\ \mu_m^{ir} \leq \delta_m^{ir} \\ \mu_{mn}^{ir} \leq \gamma_n^{ir} \end{cases} \forall\ i \in I, r \in R, m, n \in M_r; \quad (12)$$

$$\begin{cases} \xi_m^{ir} \geq \delta_m^{ir} - \chi_i \\ \xi_m^{ir} \leq \delta_m^{ir} \\ \xi_m^{ir} \leq 1 - \chi_i \end{cases} \forall\ i \in I, r \in R, m \in M_r; \quad (13)$$

where the variables are defined as follow:

| Sets: | |
| --- | --- |
| R | Set of server resource types, e.g., CPU, GPU, and memory. |
| $M_r$ | Set of resource modules associated with resource r. |
| I | Set of resource allocation requests. |
| Parameters: | |
| $C_{rm}$ | The amount of available capacity in module m of resource r. |
| $R_{rm}$ | Reliability of resource module m of resource type r. |
| $D_{ir}$ | Resource demand of request i for resource r. |
| $\theta_i$ | Reliability requirement of request i. |
| $\epsilon$ | A real number weight factor. |

-continued

Decision variables:

$\delta_m^{ir}$    A binary variable that equals one if module m of resource type r is allocated to request i for providing the working resource (this module is referred to as i's working module); zero, otherwise.

$\gamma_m^{ir}$    A binary variable that equals one if module m of resource type r is allocated to request i for providing the backup resource (this module is referred to as i's backup module); zero, otherwise.

$\sigma_i$    A binary variable that equals one if request i is successfully allocated with working resources; zero, otherwise.

$\chi_i$    A binary variable that equals one if request i is successfully allocated with backup resources; zero, otherwise.

$\omega_i$    A binary variable that equals one if request i is accepted; zero, otherwise.

$\mu_{mn}^{ir}$    A binary variable that equals one if modules m and n of the same resource type r are allocated to request i as its working and backup modules, respectively; zero, otherwise.

$\xi_m^{ir}$    A binary variable that equals one if request i is allocated with only working resources without backup, and module m of resource type r is allocated to i as its working module.

Constraints (5) and (6) ensure that each service request can get a working (or backup) resource of type r from only one module. For constraint (5), when the left part $\sigma_i=1$, the right part must be one, meaning that for all possible modules, there is one and only one of them satisfying the requirement. Constraint (7) ensures that a service request's working and backup resources cannot be shared by a module. Constraint (8) ensures that if a service request is not allocated with working resources, backup resources will not be allocated to it. On the other hand, if the service request is allocated with backup resources, it must be allocated with working resources. Constraint (9) ensures that when a service request is successfully allocated with working resources, it is accepted, regardless of whether it is allocated with backup resources or not. Constraint (10) states the physical capacity restriction. For each resource module m, the total resource demand of all of the service requests held (allocated and pending for execution) for m cannot surpass the capacity of m.

Constraint (11) ensures that the reliability requirements of each accepted service request should be fulfilled. The first term on the left side of the inequality $\Sigma_{r\in R}\Sigma_{m\in M_r}\xi_m^{ir}\cdot\log \mathcal{R}_{rm}$ corresponds to the situation that service request i is allocated with only working resources, while the second term corresponds to the situation that i is allocated also with backup. In constraint (11), models (1) and (3) are not directly applied because the product terms will be involved introducing nonlinear constraints. Instead, log function is introduced to the models (1) and (3), turning the product terms into summation terms. Given a reliability threshold $\theta_i$, the inequalities using models (1) and (3) are equivalent to below inequalities (14) and (15), respectively. In constraint (11), the left side of the inequality contains both two situations considering whether the service request is allocated with or without backup resources, but the two situations should not happen simultaneously.

$$\Sigma_{r\in R} \log \mathcal{R}_{M_r} \geq \log \theta_i; \quad (14)$$

$$\Sigma_{r\in R} \log(1-(1-\mathcal{R}_{M_r^W})\cdot(1-\mathcal{R}_{M_r^B})) \geq \log \theta_i. \quad (15)$$

Constraint (12) is equivalent to $\mu_{mn}^{ir}=\delta_m^{ir}\cdot\gamma_n^{ir}$, but in a linear approach, ensuring that only when modules m and n of the same resource type r are simultaneously allocated to service request i as its working and backup modules, $\mu_{mn}^{ir}$ equals one. Constraint (13) is equivalent to $\xi_m^{ir}=\delta_m^{ir}\cdot(1-\chi_i)$, e.g., when service request i is not allocated with backup modules but selects module m of type r as one of its working modules, the binary indicator $\xi_m^{ir}$ equals one.

The computational complexity of the ILP model in terms of both the dominant variable number and the dominant constraint number are $O(|I|\cdot|R|\cdot|M_r|^2)$, due to the variable $\mu_{mn}^{ir}$ and constraint (12), respectively.

The ILP model is unsolvable for large DDC due to its high complexity. In accordance to yet another aspect of the present invention, a heuristic process for reliability-aware resource allocation in a DDC implemented with the resource allocation method or the apparatus is provided. In this algorithm, the number of accepted service requests to the DDC is maximized from two aspects. Firstly, the reliability requirement of each service request is satisfied by allocating working resources, and only when the requirement is violated will backup resources be attempted to be allocated. Secondly, in order to guarantee the reliability of a certain service request, the reliability of modules assigned to this service request should be as high as possible. Nevertheless, this will affect the acceptance of other service requests, especially those with higher reliability requirements. Therefore, modules will be attempted to be allocated to each service request that is least reliable but reliable enough to satisfy its requirement.

In one embodiment, the heuristic process is represented by the pseudocode, Algorithm 1, listed below:

Algorithm 1

Input: i, a request; $M_r, \forall r \in R$, sets of resource modules.
Output: An integer value that equals 1 if i is accepted without backup
        allocation, 2 if accepted with backup allocation, and −1 if rejected.
1.   For $\forall r \in R$
2.     Exclude modules in $M_r$ with insufficient resources;
3.     $L_r \leftarrow$ Modules of type r in descending order of reliability;
4.     If (Trial (i,$L_r$,1)) // Allocate with no backup
5.       Return 1; //Success without backup
6.     If (Trial (i,$L_r$,2)) //Allocate with backup -continued Algorithm 1

7.  Return 2;//Success with backup
8.  Return -1; //Failure
Function: Trial (i,L$_r$,K)
Input: i, a request;
    L$_r$,∀r ∈ R, lists of modules in descending order of reliability;
    K ∈ {1,2}, the number of modules for each type needed, equaling 1
        for not allocating backup while 2 for allocating backup;
Output: A Boolean flag denoting whether success or failure.
9.  m$_{r,c}^{targ}$ = Null,∀r ∈ R, c = 1 ... K; //Initialize target modules.
10. m$_{r,c}^{cur}$ = L$_r$[c], ∀r ∈ R, c = 1... K; //Initialize K current modules of each
    type to be the first K modules in each list.
11. While (m$_{r,c}^{cur}$ ≠ Null,∀r ∈ R, ,c = 1 ... K)
12.    $\mathcal{R}_{temp}$ - reliability of i if assigned with m$_{r,c}^{cur}$, ∀r, c, computed
      according to (1) if K = = 1; (3) if K = = 2;
13.    If $\mathcal{R}_{temp}$ ≥ θ$_i$ //θ$_i$, reliability requirement of i
14.       m$_{r,c}^{targ}$ = m$_{r,c}^{cur}$,∀r ∈ R, c = 1 ... K;
15.       Among m$_{r,c}^{cur}$, ∀r ∈ R, c = 1 ... K, find the module with the
         highest reliability m$_{r^*,c^*}^{cur}$, replace it with a subsequent module
         in L$_{r^*}$ that has not been checked;
16.    Else
17.       Break;
18. If (m$_{r,c}^{targ}$ ≠ Null,∀r ∈ R, ,c = 1 ... K)
19.    Allocate resource to i from the found target modules;
20.    Return True;
21. Return False;

Algorithm 1 is executed to allocate resources to service request i. Algorithm 1 starts by excluding modules that have insufficient resources remaining with them (Line 2), e.g., the remaining resources are less than service request i's demand $D_{i,r}$ (r∈R). Then, for each resource type, a list $L_r$ (r∈R) is created to store the modules of this resource type. Since there are |R| types of resources, the number of lists is also |R|. Each list $L_r$ (r∈R) is sorted in descending order of the reliabilities of modules stored in the list (Line 3). In such an order, the former modules are more reliable than the latter, and if the former cannot satisfy the reliability requirement of the service request, there is no need to check subsequent modules further, and the service request can be immediately rejected. Of course, if the ones at the top are feasible, it is necessary to take a further step to find less reliable modules which are still adequately reliable to guarantee the reliability requirement of service request i. In Line 4, resources are attempted to be allocated to service request i with only working resources by invoking the function Trial( ) (with input K=1). If the reliability requirement can be satisfied, the function Trial( ) accepts the input and Algorithm 1 returns an integer 1 (Line 5). Otherwise, both working and backup resources are attempted to be allocated by invoking the same function with input K=2 (Line 6) and Algorithm 1 returns an integer 2 (Line 7). If both trials fail, Algorithm 1 returns -1 (Line 8), indicating that this service request cannot be satisfied and is therefore rejected.

Line 9~21 in Algorithm 1 provides the pseudocode of the function Trial( ) which has three inputs, e.g., current service request i, lists of modules $L_r$ of each resource type (∀r∈R), each of which is already sorted (Line 3), and an integer K∈{1,2}. When K=1, the function tries to allocate only working resources to service request i while meeting its reliability requirement. If K=2, the function tries to allocate both working and backup resources to service request i to meet its requirement. In Line 9, m$_{r,c}^{targ}$ represents the target modules that are finally allocated to service request i which are initialized as NULL. Although only one term m$_{r,c}^{targ}$ is used, it represents |R|×K variables. For example, if K=2 (corresponding to the situation that both working and backup resources are needed) and three types of modules are considered, this term represents six variables which are the final six chosen modules for i, e.g., m$_{\text{"CPU"},1}^{targ}$ denotes the first CPU module (or working module) that are finally allocated to the current service request i; m$_{\text{"CPU"},2}^{targ}$ denotes the second CPU module (or backup module) that are finally allocated to service request i, and m$_{\text{"Memory"},1}^{targ}$ denotes the first memory module that is finally allocated to service request i. In Line 10, the function initializes |R|×K temporary variables denoted by m$_{r,c}^{cur}$ to be the first K modules in each list. For example, if K=1, the first module in each list is checked to find whether it can fulfill the reliability requirement of service request i (Line 12). Similarly, if K=2, the first two modules in each list are attempted, where one is the working module of service request i's working module, and the other is its backup module. In Line 12, based on the value of K the reliability model is chosen either from (1) (no backup situation) or (3) (with a backup situation) to calculate the reliability of service request i. If these temporarily chosen modules (m$_{r,c}^{cur}$) can meet the requirement (Line 13), these modules are temporarily set as the final chosen module (Line 14). In Line 15, in each loop, among all m$_{r,c}^{cur}$, ∀r∈R, c=1 . . . K, only one module is changed with the highest reliability to the next module that has not been checked in the list where this module is stored. The loop terminates when no more modules can be found (Line 11) or when the current modules cannot meet service request i's requirement (Line 17). Finally, in the function Trial( ) resources are allocated to service request i (Line 19) and report a success (Line 20) if this process succeeds. Otherwise, a failure is reported (Line 21).

The example illustrated in FIG. 4 is used to further illustrate the embodiments of the heuristic process. In this example, it is assumed that K=1, e.g., only working resources and only one module of each type are attempted to be allocated. There are three types of modules, e.g., CPU, memory, and GPU modules, where each type of module is arranged in a distinct list in descending order of reliability (represented by the value in each box). Suppose the reliability requirement of the current service request is $\theta_i$=0.965. In FIG. 4, p1, p2, and p3 are pointers that point to current modules (e.g., $m_{r,c}^{cur}$) in each list in the process. In the beginning, modules c1, m1, and g1 are selected, and according to (1), the achieved reliability is $\mathcal{R}_{temp}$=0.998×0.994×0.991=0.983>$\theta_i$, meaning that these three modules can meet service request i's reliability requirement. Next, p1 is moved to c2 as c1 has the highest reliability among c1, m1, and g1. The reliability is now $\mathcal{R}_{temp}$=0.975>$\theta_i$. The next step is to move p2 to m2 as m1 has the highest reliability, to get $\mathcal{R}_{temp}$=0.969>$\theta_i$. The next step is to move p3 to g2. But this now gives $\mathcal{R}_{temp}$=0.963<$\theta_i$, meaning that current module combinations cannot fulfill service request i's reliability. The process stops here, and the final modules selected are c2, m2, and g1.

The complexity of Algorithm 1 is analyzed in the following. Assume that the adopted sorting algorithm takes T(n) time, where n is the number of elements in a sequence to be sorted. Accordingly, Lines 1~3 take O(|R|·T(|$M_r$|)) time, mainly for sorting modules of each type, where |$M_r$| is the number of modules of each resource type r∈R. The most time-consuming part of the Trial( ) function algorithm is the while-loop (Lines 11-17). Each line inside the loop-body is executed at most once in each loop. Accordingly, the while-loop takes O(|R|·|$M_r$|) time in the worst case. Other parts of the function take O(1) time. Therefore, both Line 4 and Line 6 take O |R|·|$M_r$|) time to call the function Trial( ). In total, the complexity of Algorithm 1 is in the order of O(|R|·T(|$M_r$|)+|R|·|$M_r$|).

Algorithm 1 allocates resources for only one service request. For the scenario of batch service requests, the order of service requests directly impacts the total number of acceptances. To maximize the objective function (4), a shuffling process is employed. For this, given a set of requests I, the order of requests in I is randomized, and then resources for each request according to the randomized order are attempted to be allocated by invoking Algorithm 1. This randomize-then-attempt procedure is executed many times and finally the result with the maximum value of the objective function (4) is chosen.

The heuristic process is executed each time a resource allocation is made to determine whether to accept or reject a service request. The embodiments of the heuristic process and their examples are described and illustrated above with only a static scenario where all the service requests are assumed to be known in advance. Nevertheless, the heuristic process is also applicable to a dynamic situation, and the execution frequency of this algorithm depends on the arrival rate of the service requests.

The functional units, modules, models, and algorithms of the apparatuses and the methods in accordance to the embodiments disclosed herein may be implemented using electronic devices, computer processors, or electronic circuitries including but not limited to application specific integrated circuits (ASIC), field programmable gate arrays (FPGA), and other programmable logic devices configured or programmed according to the teachings of the present disclosure. Machine instructions running in the electronic devices, computer processors, or programmable logic devices can readily be prepared by practitioners skilled in the software or electronic art based on the teachings of the present disclosure.

All or portions of the methods in accordance to the embodiments may be executed in one or more electronic devices including server computers, personal computers, laptop computers, mobile computing devices such as smartphones and tablet computers.

The embodiments include computer storage media having machine instructions stored therein which can be used to configured microprocessors to perform any of the processes of the present invention. The storage media can include, but are not limited to, floppy disks, optical discs, Blu-ray Disc, DVD, CD-ROMS, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A disaggregated data center (DDC), comprising:
   a plurality of working nodes, each of the working nodes comprises one or more computing resources of only one computing resource type, the computing resource type selected from a group of computing resource types comprising: central processing unit (CPU), graphical processing unit (GPU), transient memory circuitry, and non-transient memory circuitry;
   a plurality of backup nodes, each of the backup nodes comprising one or more computing resources of only one computing resource type, the computing resource type selected from a group of computing resource types comprising: a central processing unit (CPU), a graphical processing unit (GPU), transient memory circuitry, and non-transient memory circuitry;
   a first processor configured to execute a reliability model to determine an achievable reliability for a service request to the DDC; and
   a second processor configured to execute an integer linear programming (ILP) model to perform a resource allocation for the service request to the DDC;
   wherein the DDC comprises multiple computing resource types, and the execution of the service request received by the DDC requires performance of computing resource of at least one of the computing resource types; and
   wherein nodes of same computing resource type are configured to form a parallel system such that as long as at least one of the nodes in the parallel system is available, the parallel system is available for performance in the execution of the service request received by the DDC;
   wherein each service request received by the DDC is executed by one or more working nodes corresponding to one or more necessary computing resource type respectively for an execution of the service request; and if a reliability of the one or more working nodes is lower than a reliability requirement for the service request, the service request is executed by one or more backup nodes corresponding to the one or more necessary computing resource types respectively;

wherein the performance of the ILP model comprises:
maximizing total number of service requests received by the DDC accepted for execution;
minimizing number of the accepted service requests allocated with backup nodes; and
subjecting to one or more of constraints comprising:
a working node and a backup node allocated to the service request do not share a same computing resource;
if the reliability of the one or more working nodes allocated to the service request is equal or higher than the reliability requirement for the service request, the service request is accepted for execution regardless of whether one or more backup nodes are allocated to the service request;
a total resource demand of all service requests allocated with a node and pending for execution is not higher than a resource capacity of the node; and
a reliability of computing resources of a computing resource type in the DDC must equal or higher than the reliability requirement of the service request before its acceptance for execution.

2. The disaggregated data center (DDC) of claim 1,
wherein the reliability model determines the achievable reliability by computing a product of reliabilities of all of the parallel systems;
wherein a reliability is a probability of normal working of a system or a node;
wherein each of the parallel systems comprises a working node $\mathcal{M}_r^W$ and a backup node $\mathcal{M}_r^B$ of computing resource type r;
wherein the working node $\mathcal{M}_r^W$ having a reliability $\mathcal{R}_{\mathcal{M}_r^W}$;
wherein the backup node $\mathcal{M}_r^B$ having a reliability $\mathcal{R}_{\mathcal{M}_r^B}$;
wherein the working node $\mathcal{M}_r^W$ and the backup node $\mathcal{M}_r^B$ are arranged to form the parallel system of computing resource type r; and
wherein a reliability of the parallel system of computing resource type r is obtained by computing:

$$1-(1-\mathcal{R}_{\mathcal{M}_r^W})\cdot(1-\mathcal{R}_{\mathcal{M}_r^B}).$$

3. A method for autonomously allocating resources in the disaggregated data center (DDC) of claim 1 in order to improve reliability of the disaggregated data center (DDC), comprising:
executing a reliability model in the first processor to determine an achievable reliability for a service request to the DDC, and
executing an integer linear programming (ILP) model in the second processor to perform a resource allocation for the service request to the DDC;
wherein the DDC comprises multiple computing resource types, and the execution of the service requested received by the DDC requires performance of computing resource of at least one of the computing resource types; and
wherein nodes of same computing resource type are configured to form a parallel system such that as long as at least one of the nodes in the parallel system is available, the parallel system is available for performance in the execution of the service requested received by the DDC;

wherein each service request received by the DDC is executed by one or more working nodes corresponding to one or more necessary computing resource type respectively for an execution of the service request; and
if a reliability of the one or more working nodes is lower than a reliability requirement for the service request, the service request is executed by one or more backup nodes corresponding to the one or more necessary computing resource types respectively;

wherein the performance of the ILP model comprises:
maximizing total number of service requests received by the DDC accepted for execution;
minimizing number of the accepted service requests allocated with backup nodes; and
subjecting to one or more of constraints comprising:
a working node and a backup node allocated to the service request do not share a same computing resource;
if the reliability of the one or more working nodes allocated to the service request is equal or higher than the reliability requirement for the service request, the service request is accepted for execution regardless of whether one or more backup nodes are allocated to the service request;
a total resource demand of all service requests allocated with a node and pending for execution is not higher than a resource capacity of the node; and
a reliability of computing resources of a computing resource type in the DDC must equal or higher than & the reliability requirement of the service request before its acceptance for execution.

4. The method of claim 3,
wherein the reliability model determines the achievable reliability by computing a product of reliabilities of all of the parallel systems;
wherein a reliability is a probability of normal working of a system or a node;
wherein each of the parallel systems comprises a working node $\mathcal{M}_r^W$ and a backup node $\mathcal{M}_r^B$ of computing resource type r;
wherein the working node $\mathcal{M}_r^W$ having a reliability $\mathcal{R}_{\mathcal{M}_r^W}$;
wherein the backup node $\mathcal{M}_r^B$ having a reliability $\mathcal{R}_{\mathcal{M}_r^B}$;
wherein the working node $\mathcal{M}_r^W$ and the backup node $\mathcal{M}_r^B$ are arranged to form the parallel system of computing resource type r; and
wherein a reliability of the parallel system of computing resource type r is obtained by computing:

$$1-(1-\mathcal{R}_{\mathcal{M}_r^W})\cdot(1-\mathcal{R}_{\mathcal{M}_r^B}).$$

5. A disaggregated data center (DDC), comprising:
a plurality of working nodes, each of the working nodes comprises one or more computing resources of only one computing resource type, the computing resource type selected from a group of computing resource types comprising: central processing unit (CPU), graphical processing unit (GPU), transient memory circuitry, and non-transient memory circuitry;
a plurality of backup nodes, each of the backup nodes comprising one or more computing resources of only one computing resource type, the computing resource type selected from a group of computing resource types comprising: a central processing unit (CPU), a graphical processing unit (GPU), transient memory circuitry, and non-transient memory circuitry;

a first processor configured to execute a reliability model to determine an achievable reliability for a service request to the DDC; and a second processor configured to execute a heuristic process to perform the resource allocation for the service request to the DDC;

wherein the DDC comprises multiple computing resource types, and the execution of the service requested received by the DDC requires performance of computing resource of at least one of the computing resource types;

wherein nodes of same computing resource type are configured to form a parallel system such that as long as at least one of the nodes in the parallel system is available, the parallel system is available for performance in the execution of the service requested received by the DDC;

wherein each service request received by the DDC is executed by one or more working nodes corresponding to one or more necessary computing resource type respectively for an execution of the service request; and if a reliability of the one or more working nodes is lower than a reliability requirement for the service request, the service request is executed by one or more backup nodes corresponding to the one or more necessary computing resource types respectively;

wherein the heuristic process comprises:

excluding one or more of the working or backup nodes for being available for execution of a service request received by the DDC, wherein the one or more excluded nodes have insufficient resource capacity to satisfy a resource demand of the service request;

sorting the working and backup nodes of each of the computing resource types necessary for an execution of the service request based on a reliability of each of the working and backup nodes of the computing resource type into lists of nodes of the computing resource types necessary for the execution of the service request;

iterating through each of the lists to find a first working or backup node with a least reliability among the working or backup nodes of each of the computing resource types necessary for the execution of the service request such that a product of the reliabilities of the first nodes of all of the computing resource types necessary for the execution of the service request is equal or higher than a reliability requirement of the service request;

if the first working or backup nodes are found such that the product of the reliabilities of the first working or backup nodes is equal or higher than a reliability requirement of the service request, the first working or backup nodes found execute the service request as its working nodes;

else if the first working or backup nodes are not found such that the product of the reliabilities of the first nodes is equal or higher than a reliability requirement of the service request, then iterating through each of the lists to find a first and second node pair with two least reliabilities among the nodes of each of the computing resource types necessary for the execution of the service request such that a product of the reliabilities of the first and second node pairs each acting as a parallel system of all of the computing resource types necessary for the execution of the service request is equal or higher than a reliability requirement of the service request.

6. A method for autonomously allocating resources in the disaggregated data center (DDC) of claim 5 in order to improve reliability of the disaggregated data center (DDC) comprising:

executing a reliability model in the first processor to determine an achievable reliability for a service request to the DDC; and executing a heuristic process in the second processor to perform a resource allocation for the service request to the DDC, wherein the DDC comprises multiple computing resource types, and the execution of the service request received by the DDC requires performance of computing resource of at least one of the computing resource types;

wherein nodes of same computing resource type are configured to form a parallel system such that as long as at least one of the nodes in the parallel system is available, the parallel system is available for performance in the execution of the service request received by the DDC;

wherein each service request received by the DDC is executed by one or more working nodes corresponding to one or more necessary computing resource type respectively for an execution of the service request, and if a reliability of the one or more working nodes is lower than a reliability requirement for the service request, the service request is executed by one or more backup nodes corresponding to the one or more necessary computing resource types respectively;

wherein the heuristic process comprises:

excluding one or more of the working or backup nodes for being available for execution of a service request received by the DDC, wherein the one or more excluded nodes have insufficient resource capacity to satisfy a resource demand of the service request, sorting the working and backup nodes of each of the computing resource types necessary for an execution of the service request based on a reliability of each of the working and backup nodes of the computing resource type into lists of nodes of the computing resource types necessary for the execution of the service request, iterating through each of the lists to find a first working or backup node with a least reliability among the working or backup nodes of each of the computing resource types necessary for the execution of the service request such that a product of the reliabilities of the first nodes of all of the computing resource types necessary for the execution of the service request is equal or higher than a reliability requirement of the service request;

if the first working or backup nodes are found such that the product of the reliabilities of the first working or backup nodes is equal or higher than a reliability requirement of the service request, the first working or backup 10 nodes found execute the service request as its working nodes:

else if the first working or backup nodes are not found such that the product of the reliabilities of the first nodes is equal or higher than a reliability requirement of the service request, then iterating through each of the lists to find a first and second node pair with two least reliabilities among the nodes of each of the computing resource types necessary for the execution of the service request such that a product of the reliabilities of the first and second node pairs each acting as a parallel system of all of the computing resource types necessary for the execution of the service request is equal or higher than a reliability requirement of the service request.

7. The method of claim 6, wherein the reliability model determines the achievable reliability by computing a product of reliabilities of all of the parallel systems;

wherein a reliability is a probability of normal working of a system or a node;

wherein each of the parallel systems comprises a working node $\mathcal{M}_r^W$ and a backup node $\mathcal{M}_r^B$ of computing resource type r;

wherein the working node $\mathcal{M}_r^W$ having a reliability $\mathcal{R}_{\mathcal{M}_r^W}$;

wherein the backup node $\mathcal{M}_r^B$ having a reliability $\mathcal{R}_{\mathcal{M}_r^B}$;

wherein the working node $\mathcal{M}_r^W$ and the backup node $\mathcal{M}_r^B$ are arranged to form the parallel system of computing resource type r; and wherein a reliability of the parallel system of computing resource type r is obtained by computing:

$1-(1-\mathcal{R}_{\mathcal{M}_r^W})\cdot(1-\mathcal{R}_{\mathcal{M}_r^B})$.

8. The disaggregated data center (DDC) of claim 5, wherein the reliability model determines the achievable reliability by computing a product of reliabilities of all of the parallel systems;

wherein a reliability is a probability of normal working of a system or a node;

wherein each of the parallel systems comprises a working node $\mathcal{M}_r^W$ and a backup node $\mathcal{M}_r^B$ of computing resource type r;

wherein the working node $\mathcal{M}_r^W$ having a reliability $\mathcal{R}_{\mathcal{M}_r^W}$;

wherein the backup node $\mathcal{M}_r^B$ having a reliability $\mathcal{R}_{\mathcal{M}_r^B}$;

wherein the working node $\mathcal{M}_r^W$ and the backup node $\mathcal{M}_r^B$ are arranged to form the parallel system of computing resource type r; and wherein a reliability of the parallel system of computing resource type r is obtained by computing:

$1-(1-\mathcal{R}_{\mathcal{M}_r^W})\cdot(1-\mathcal{R}_{\mathcal{M}_r^B})$.

* * * * *